(12) United States Patent
Chae et al.

(10) Patent No.: US 10,738,173 B2
(45) Date of Patent: Aug. 11, 2020

(54) POLY(AMIDE-IMIDE) COPOLYMER FILM, WINDOW FOR DISPLAY DEVICE, AND DISPLAY DEVICE

(71) Applicants: SAMSUNG ELECTRONICS CO., LTD., Suwon-si, Gyeonggi-do (KR); Samsung SDI Co., Ltd., Yongin-si, Gyeonggi-do (KR)

(72) Inventors: Jungha Chae, Yongin-si (KR); Chanjae Ahn, Suwon-si (KR); Kyeong-Sik Ju, Suwon-si (KR)

(73) Assignees: SAMSUNG ELECTRONICS CO., LTD., Gyeonggi-Do (KR); SAMSUNG SDI CO., LTD., Gyeonggi-Do (KR)

( * ) Notice: Subject to any disclaimer, the term of this patent is extended or adjusted under 35 U.S.C. 154(b) by 400 days.

(21) Appl. No.: 15/602,616

(22) Filed: May 23, 2017

(65) Prior Publication Data

US 2017/0342224 A1 Nov. 30, 2017

(30) Foreign Application Priority Data

May 24, 2016 (KR) .................. 10-2016-0063458

(51) Int. Cl.
| | | |
|---|---|---|
| *C08J 5/18* | (2006.01) | |
| *G09F 9/30* | (2006.01) | |
| *C08G 73/14* | (2006.01) | |
| *G06F 1/16* | (2006.01) | |
| *B32B 27/28* | (2006.01) | |

(52) U.S. Cl.
CPC ............... *C08J 5/18* (2013.01); *C08G 73/14* (2013.01); *G06F 1/1652* (2013.01); *G09F 9/301* (2013.01); *B32B 27/281* (2013.01); *B32B 2457/20* (2013.01); *C08J 2379/08* (2013.01); *Y10T 428/31721* (2015.04)

(58) Field of Classification Search
CPC ... B32B 27/281; B32B 2457/20; C08G 73/14; C08J 2379/08; C08J 5/18; G06F 1/1652; G09F 9/301; Y10T 428/31721
See application file for complete search history.

(56) References Cited

U.S. PATENT DOCUMENTS

| | | | |
|---|---|---|---|
| 6,329,041 B1* | 12/2001 | Tsuchiya ............... | C08J 7/04 |
| | | | 428/195.1 |
| 9,018,343 B2 | 4/2015 | Park et al. | |
| 9,580,555 B2 | 2/2017 | Ju et al. | |
| 2004/0105987 A1* | 6/2004 | Hongo ............... | G02B 1/105 |
| | | | 428/447 |
| 2016/0319076 A1* | 11/2016 | Ju ............... | C08J 5/18 |
| 2019/0077960 A1* | 3/2019 | Kim ............... | C08L 79/08 |

FOREIGN PATENT DOCUMENTS

| | | |
|---|---|---|
| CN | 105017534 A | 11/2015 |
| JP | 2004-323665 A | 11/2004 |
| KR | 2006-0115682 A | 11/2006 |
| KR | 2013-0035691 A | 4/2013 |
| KR | 2015-0076114 A | 7/2015 |

\* cited by examiner

*Primary Examiner* — John D Freeman
(74) *Attorney, Agent, or Firm* — Cantor Colburn LLP (57) ABSTRACT

A poly(amide-imide) copolymer film having a tensile modulus of greater than or equal to 5.4 GPa, and a yellowness index of less than or equal to 3.6, wherein the poly(amide-imide) copolymer film is a reaction product of an aromatic dianhydride including biphenyl tetracarboxylic dianhydride and 4,4'-hexafluoroisopropylidene diphthalic dianhydride, an aliphatic dianhydride including 1,2,3,4-cyclobutane tetracarboxylic dianhydride, an aromatic diamine including 2,2-bis(trifluoromethyl) benzidine, and an aromatic dicarbonyl compound including terephthaloyl dichloride.

18 Claims, 2 Drawing Sheets

POLY(AMIDE-IMIDE) COPOLYMER FILM, WINDOW FOR DISPLAY DEVICE, AND DISPLAY DEVICE

CROSS-REFERENCE TO RELATED APPLICATIONS

This application claims priority to Korean Patent Application No. 10-2016-0063458 filed on May 24, 2016, and all the benefits accruing therefrom under 35 U.S.C. § 119, the content of which is incorporated herein in its entirety by reference.

BACKGROUND

1. Field

This disclosure relates to a poly(amide-imide) copolymer film, a window for display device including the film, and a display device including the window.

2. Description of the Related Art

Portable display devices, such as, a smart phone or a tablet PC have been an object of active research because of their high performance and popularity. For example, light-weight flexible (i.e., bendable or foldable) and portable display devices have been studied and commercially developed. The portable display device of a liquid crystal display or the like includes a protective window for protecting a display module such as a liquid crystal layer. Currently, most portable display devices have a window including a rigid glass substrate. However, since glass is fragile, when applied to a portable display device or the like, it can be easily cracked or broken by an exterior impact. In addition, glass is rigid, so it may not be applied in a flexible display device. Therefore, attempts have been made to substitute a protective window with a plastic film in a display device. However, it is very difficult to simultaneously satisfy good mechanical properties (such as hardness) and optical properties of the plastic film, which are desired for the protective window in a display device. Accordingly, development of the plastic film material as a protective window for a display device has been delayed.

Thus, there remains a need in a polymer material having improved mechanical properties, while maintaining good optical properties.

SUMMARY

An embodiment relates to a poly(amide-imide) copolymer film having good mechanical and optical properties.

Another embodiment relates to a window for a display device including a poly(amide-imide) copolymer film.

Yet another embodiment relates to a display device including the window for a display device.

According to an embodiment, provided is a poly(amide-imide) copolymer film having a tensile modulus of greater than or equal to 5.4 giga pascales, and a yellowness index of less than or equal to 3.6, wherein the poly(amide-imide) copolymer film may be a reaction product of an aromatic dianhydride including biphenyl tetracarboxylic dianhydride and 4,4'-hexafluoroisopropylidene diphthalic dianhydride, an aliphatic dianhydride including 1,2,3,4-cyclobutane tetracarboxylic dianhydride, an aromatic diamine including 2,2-bis (trifluoromethyl) benzidine, and an aromatic dicarbonyl compound including terephthaloyl dichloride.

The poly(amide-imide) copolymer film may be a reaction product of the aromatic dianhydride, the aliphatic dianhydride, the aromatic diamine, and the aromatic dicarbonyl compound, wherein an amount of 1,2,3,4-cyclobutane tetracarboxylic dianhydride may be less than 46 mole percent based on the total amount of the aromatic dianhydride, the aliphatic dianhydride, and the aromatic dicarbonyl compound in the reaction.

An amount of 1,2,3,4-cyclobutane tetracarboxylic dianhydride may be greater than or equal to 5 mole percent and less than or equal to 45 mole percent based on the total amount of the aromatic dianhydride, the aliphatic dianhydride, and the aromatic dicarbonyl compound in the reaction.

An amount of 1,2,3,4-cyclobutane tetracarboxylic dianhydride may be greater than or equal to 10 mole percent and less than or equal to 45 mole percent based on the total amount of the aromatic dianhydride, the aliphatic dianhydride, and the aromatic dicarbonyl compound in the reaction.

The poly(amide-imide) copolymer film may be a reaction product of the aromatic dianhydride, the aliphatic dianhydride, the aromatic diamine, and the aromatic dicarbonyl compound, wherein an amount of terephthaloyl dichloride may be greater than or equal to 25 mole percent and less than or equal to 75 mole percent based on the total amount of the aromatic dianhydride, the aliphatic dianhydride, and the aromatic dicarbonyl compound in the reaction.

An amount of terephthaloyl dichloride may be greater than or equal to 30 mole percent and less than or equal to 70 mole percent based on the total amount of the aromatic dianhydride, the aliphatic dianhydride, and the aromatic dicarbonyl compound.

The poly(amide-imide) copolymer film may be a reaction product of the aromatic dianhydride, the aliphatic dianhydride, the aromatic diamine, and the aromatic dicarbonyl compound, wherein an amount of biphenyl tetracarboxylic dianhydride may be greater than or equal to 5 mole percent based on the total amount of the aromatic dianhydride, the aliphatic dianhydride, and the aromatic dicarbonyl compound in the reaction.

An amount of biphenyl tetracarboxylic dianhydride may be greater than or equal to 10 mole percent based on the total amount of the aromatic dianhydride, the aliphatic dianhydride, and the aromatic dicarbonyl compound in the reaction.

Biphenyl tetracarboxylic dianhydride may include at least one of 3,3',4,4'-biphenyltetracarboxylic dianhydride, 2,3,3', 4'-biphenyltetracarboxylic dianhydride, 2,2',3,3'-biphenyltetracarboxylic dianhydride, or a combination thereof.

The poly(amide-imide) copolymer film may be a reaction product of the aromatic dianhydride, the aliphatic dianhydride, the aromatic diamine, and the aromatic dicarbonyl compound, wherein an amount of 4,4'-hexafluoroisopropylidene diphthalic dianhydride may be greater than or equal to 10 mole percent based on the total amount of the aromatic dianhydride, the aliphatic dianhydride, and the aromatic dicarbonyl compound in the reaction.

An amount of 4,4'-hexafluoroisopropylidene diphthalic dianhydride may be greater than or equal to 15 mole percent based on the total amount of the aromatic dianhydride, the aliphatic dianhydride, and the aromatic dicarbonyl compound in the reaction.

The poly(amide-imide) copolymer film may be a reaction product of the aromatic dianhydride, the aliphatic dianhydride, the aromatic diamine, and the aromatic dicarbonyl compound, wherein an amount of 1,2,3,4-cyclobutane tetracarboxylic dianhydride in the reaction may be greater than or equal to 10 mole percent and less than or equal to 45 mole percent, an amount of biphenyl tetracarboxylic dianhydride in the reaction may be greater than or equal to 10 mole percent and less than or equal to 45 mole percent, an amount of 4,4'-hexafluoroisopropylidene diphthalic dianhydride in the reaction may be greater than or equal to 10 mole percent and less than or equal to 30 mole percent, and an amount of terephthaloyl dichloride in the reaction may be greater than or equal to 30 mole percent and less than or equal to 70 mole percent, based 100 mole percent of 2,2-bis(trifluoromethyl) benzidine.

The poly(amide-imide) copolymer film has a light transmittance of greater than or equal to 88% in a wavelength range of 380 nanometers to 780 nanometers.

In another embodiment, provided is a window for a display device including a poly(amide-imide) copolymer film, according to an embodiment.

The window may include a hard coating layer disposed on at least one surface of the poly(amide-imide) copolymer film.

The hard coating layer may include at least one selected from an acrylate polymer, a polycaprolactone, a urethane-acrylate copolymer, a polyrotaxane, an epoxy polymer, an organosilicone material, an inorganic hard coating material, or a combination thereof.

According to still another embodiment, provided is a display device including the window for a display device, according to an embodiment.

The display device may be a flexible display device.

Hereinafter, further embodiments will be described in detail.

BRIEF DESCRIPTION OF THE DRAWINGS

The above and other aspects, advantages and features of this disclosure will become more apparent by describing in further detail exemplary embodiments thereof with reference to the accompanying drawings, in which.

DETAILED DESCRIPTION

This disclosure will be described more fully hereinafter with reference to the accompanying drawings, in which some but not all embodiments are shown. In addition, dimensional ratios in the drawings may be exaggerated and different from actual ratios for ease of explanation. This disclosure may, however, be embodied in many different forms and is not to be construed as limited to the exemplary embodiments set forth herein. Rather, these embodiments are provided so that this disclosure will fully convey the scope of the invention to those skilled in the art. Thus, in some exemplary embodiments, well-known technologies are not specifically explained to avoid ambiguous understanding of the present inventive concept. Unless otherwise defined, all terms used in the specification (including technical and scientific terms) may be used with meanings commonly understood by a person having ordinary knowledge in the art. Further, unless explicitly defined to the contrary, the terms defined in a generally-used dictionary are not ideally or excessively interpreted.

It will be understood that when an element is referred to as being "on" another element, it may be directly on the other element or intervening elements may be present therebetween. In contrast, when an element is referred to as being "directly on" another element, there are no intervening elements present.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an" and "the" are intended to include the plural forms as well, unless the context clearly indicates otherwise. The term "or" means "and/or." As used herein, the term "and/or" includes any and all combinations of one or more of the associated listed items. Expressions such as "at least one of," when preceding a list of elements, modify the entire list of elements and do not modify the individual elements of the list.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

As used herein, the term "mixture" is inclusive of all types of combinations, including blends, alloys, solutions, and the like.

As used herein, when a definition is not otherwise provided, "combination" commonly refers to mixing or copolymerization.

As used herein, when a definition is not otherwise provided, "polyimide" may refer to not only "polyimide", but also "polyamic acid" or a combination of "polyimide" and "polyamic acid". Further, the terms "polyimide" and "polyamic acid" may be understood as the same material.

Research efforts towards converting mobile devices, such as, a mobile phone or a tablet personal computer, and the like, to light, flexible, and bendable devices is currently ongoing. In this regard, a flexible and transparent window film for a display device having a high hardness for replacing a rigid glass placed on top of the mobile devices is desired.

To be used as a window film, a high hardness and good optical properties are desired. Hardness may be supplemented with a hard coating layer, but a base film having a high tensile modulus may provide a final film having a high hardness. Desired optical properties include high light transmittance, low haze, low yellowness index, and the like.

A polyimide or poly(imide-aramide) copolymer has excellent mechanical, thermal, and optical properties, and thus, is widely used as a plastic substrate for a display device, such as an organic light emitting device (OLED), liquid crystal device (LCD), and the like. In order to use polyimide or poly(imide-amide) film as a window film for a flexible display device, however, further improved mechanical and optical properties, such as, high hardness (or modulus), high transmittance, low yellowness index, and the like, are desired.

It is difficult, however, to improve both the mechanical and optical properties at the same time, as the modulus and yellowness index of a polyimide or poly(imide-amide) film have a trade-off relationship with regard to each other. For example, in an effort to improve mechanical properties of a poly(imide-amide) copolymer film, researchers prepared a poly(imide-amide) copolymer by increasing the amount of an amide structural unit, or by including a dianhydride having a more rigid structure. In this case, however, tensile modulus hardly improves, or optical property, such as YI, is deteriorated.

The inventors of the present application have found that a combination of a dianhydride, a diamine, and a dicarbonyl compound that may realize a poly(amide-imide) copolymer having improved mechanical properties, while maintaining good optical properties. Accordingly, according to an embodiment, a poly(amide-imide) copolymer film has a tensile modulus of greater than or equal to 5.4 giga pascales (GPa), and a yellowness index (YI) of less than or equal to 3.6, where the poly(amide-imide) copolymer film is a reaction product of an aromatic dianhydride including BPDA (biphenyl tetracarboxylic dianhydride) and 6FDA (4,4'-hexafluoroisopropylidene diphthalic dianhydride), an aliphatic dianhydride including CBDA (1,2,3,4-cyclobutane tetracarboxylic dianhydride), an aromatic diamine including TFDB (2,2-bis(trifluoromethyl) benzidine), and an aromatic dicarbonyl compound including TPCl (terephthaloyl dichloride).

A poly(amide-imide) copolymer is generally prepared by copolymerizing an aromatic dianhydride, an aromatic diamine, and an aromatic dicarbonyl compound. The aromatic dianhydride and aromatic diamine are believed to realize a polyimide having high thermal stability and good mechanical properties by including an aromatic group, i.e., benzene ring. However, in order to be used as a window for a display device, much higher hardness and better optical properties should be achieved, which is not easy to do as the two properties are in a trade-off relationship.

However, as described above, the poly(amide-imide) copolymer film, according to an embodiment, may have a tensile modulus of greater than or equal to 5.4 GPa, and YI of less than or equal to 3.6, as a combination of an aliphatic dianhydride, such as, for example, CBDA, and an aromatic dianhydride, and an aromatic dicarbonyl compound are copolymerized with an aromatic diamine.

The aromatic dianhydride may include BPDA and 6FDA, and may further include one or more of other aromatic dianhydrides.

The other aromatic dianhydrides, except for BPDA and 6FDA, may include, for example, 3,3',4,4'-biphenylsulfone tetracarboxylic dianhydride (DSDA), 4,4'-oxydiphthalic anhydride (ODPA), pyromellitic dianhydride (PMDA), dioxotetrahydrofuran-3-yl)-1,2,3,4-tetrahydronaphthalene-1,2-dicarboxylic anhydride (DTDA), 1,2,4,5-benzene tetracarboxylic dianhydride; 1,2,3,4-benzene tetracarboxylic dianhydride; 1,4-bis(2,3-dicarboxyphenoxy) benzene dianhydride; 1,3-bis(3,4-dicarboxyphenoxy) benzene dianhydride; 1,2,4,5-naphthalene tetracarboxylic dianhydride; 1,2,5,6-naphthalene tetracarboxylic dianhydride; 1,4,5,8-naphthalene tetracarboxylic dianhydride; 2,3,6,7-naphthalene tetracarboxylic dianhydride; 2,6-dichloronaphthalene-1,4,5,8-tetracarboxylic dianhydride; 2,7-dichloronaphthalene-1,4,5,8-tetracarboxylic dianhydride; 2,3,6,7-tetrachloronaphthalene-1,4,5,8-tetracarboxylic dianhydride; 4,4'-bis(3,4-dicarboxyphenoxy) biphenyl dianhydride; bis(2,3-dicarboxyphenyl) ether dianhydride; 4,4'-bis(2,3-dicarboxyphenoxy) biphenyl ether dianhydride; 4,4'-bis(3,4-dicarboxyphenoxy) biphenyl ether dianhydride; bis(3,4-dicarboxyphenyl) sulfide dianhydride; 4,4'-bis(2,3-dicarboxyphenoxy) biphenyl sulfide dianhydride; 4,4'-bis(3,4-dicarboxyphenoxy) diphenyl sulfide dianhydride; bis(3,4-dicarboxyphenyl) sulfone dianhydride; 4,4'-bis(2,3-dicarboxyphenoxy) biphenyl sulfone dianhydride; 4,4'-bis(3,4-dicarboxyphenoxy) biphenylsulfone dianhydride; 3,3',4,4'-benzophenone tetracarboxylic dianhydride; 2,2',3,3'- benzophenone tetracarboxylic dianhydride; 2,3,3'4'-benzophenone tetracarboxylic dianhydride; 4,4'-bis(3,4-dicarboxyphenoxy) benzophenone dianhydride; bis(2,3-dicarboxyphenyl) methane dianhydride; bis(3,4-dicarboxyphenyl) methane dianhydride; 1,1-bis(2,3-dicarboxyphenyl) ethane dianhydride; 1,1-bis(3,4-dicarboxyphenyl) ethane dianhydride; 1,2-bis(3,4-dicarboxyphenyl) ethane dianhydride; 2,2-bis(2,3-dicarboxyphenyl) propane dianhydride; 2,2-bis(3,4-dicarboxyphenyl) propane dianhydride; 2,2-bis[4-(2,3-dicarboxyphenoxy) phenyl] propane dianhydride; 2,2-bis[4-(3,4-dicarboxyphenoxy) phenyl] propane dianhydride; 4-(2,3-dicarboxyphenoxy)-4'-(3,4-dicarboxyphenoxy) biphenyl-2,2-propane dianhydride; 2,2-bis[4-(3,4-dicarboxyphenoxy-3,5-dimethyl) phenyl] propane dianhydride; 2,3,4,5-thiophen tetracarboxylic dianhydride; 2,3,5,6-pyrizine tetracarboxylic dianhydride; 1,8,9,10-phenanthrene tetracarboxylic dianhydride; 3,4,9,10-perylene tetracarboxylic dianhydride; 2,2-bis(3,4-dicarboxyphenyl) hexafluoropropane dianhydride; 1,3-bis(3,4-dicarboxyphenyl) hexafluoropropane dianhydride; 1,1-bis(3,4-dicarboxyphenyl)-1-phenyl-2,2,2-trifluoroethane dianhydride; 2,2-bis[4-(3,4-dicarboxyphenoxy) phenyl] hexafluoropropane dianhydride; 1,1-bis[4-(3,4-dicarboxyphenoxy) phenyl]-1-phenyl-2,2,2-trifluoroethane dianhydride; 4,4'-bis[2-(3,4-dicarboxyphenyl)hexafluoroisopropyl] biphenyl ether dianhydride; or a combination thereof, but are not limited thereto. These dianhydride compounds may be commercially available or may be synthesized by using a method well-known to a person skilled in the related art.

The aromatic diamine may include TFDB, and may further include one or more of other diamines except for TFDB.

The other diamines may include, for example, m-phenylene diamine; p-phenylene diamine; 1,3-bis(4-aminophenyl) propane; 2,2-bis(4-aminophenyl) propane; 4,4'-diamino-diphenyl methane; 1,2-bis(4-aminophenyl) ethane; 1,1-bis(4-aminophenyl) ethane; 2,2'-diamino-diethyl sulfide; bis(4-aminophenyl) sulfide; 2,4'-diamino-diphenyl sulfide; bis(3-aminophenyl) sulfone; bis(4-aminophenyl) sulfone; 4,4'-diamino-dibenzyl sulfoxide; bis(4-aminophenyl) ether; bis(3-aminophenyl) ether; bis(4-aminophenyl)diethyl silane; bis(4-aminophenyl) diphenyl silane; bis(4-aminophenyl) ethyl phosphine oxide; bis(4-aminophenyl) phenyl phosphine oxide; bis(4-aminophenyl)-N-phenyl amine; bis (4-aminophenyl)-N-methylamine; 1,2-diamino-naphthalene, 1,4-diamino-naphthalene; 1,5-diamino-naphthalene, 1,6-diamino-naphthalene, 1,7-diamino-naphthalene; 1,8-diamino-naphthalene, 2,3-diamino-naphthalene; 2,6-diamino-naphthalene; 1,4-diamino-2-methyl-naphthalene, 1,5-diamino-2-methyl-naphthalene, 1,3-diamino-2-phenyl-naphthalene; 4,4'-diamino-biphenyl; 3,3'-diamino-biphenyl; 3,3'-dichloro-4,4'-diamino-biphenyl; 3,3'-dimethyl-4,4'-diamino-biphenyl; 3,3'-dimethyl-4,4'-diamino-biphenyl; 3,3'-dimethoxy-4,4'-diamino-biphenyl; 4,4'-bis(4-aminophenoxy)-biphenyl; 2,4-diamino-toluene; 2,5-diamino-toluene; 2,6-diamino-toluene; 3,5-diamino-toluene; 1,3-diamino-2,5-dichloro-benzene, 1,4-diamino-2,5-dichloro-benzene, 1-methoxy-2,4-diamino-benzene; 1,4-diamino-2-methoxy-5-methyl-benzene, 1,4-diamino-2,3,5,6-tetramethyl-benzene, 1,4-bis(2-methyl-4-amino-pentyl)-benzene, 1,4-bis(1,1-dimethyl-5-amino-pentyl)-benzene, 1,4-bis(4-aminophenoxy)-benzene, o-xylylene diamine; m-xylylene diamine; p-xylylene diamine; 3,3'-diamino-benzophenone; 4,4'-diamino-benzophenone; 2,6-diamino-pyridine; 3,5-diamino-pyridine; 1,3-diamino-adamantane, bis[2-(3-aminophenyl)hexafluoroisopropyl] diphenyl ether; 3,3'-diamino-1,1'-diadamantane, N-(3-aminophenyl)-4-aminobenzamide; 4-aminophenyl-3-aminobenzoate; 2,2-bis(4-aminophenyl) hexafluoropropane; 2,2-bis(3-aminophenyl) hexafluoropropane; 2-(3-aminophenyl)-2-(4-aminophenyl)hexafluoropropane; 2,2-bis[4-(4-aminophenoxy)phenyl] hexafluoropropane; 2,2-bis[4-(2-chloro-4-aminophenoxy)phenyl hexafluoropropane; 1,1-bis(4-aminophenyl)-1-phenyl-2,2,2-trifluoroethane; 1,1-bis[4-(4-aminophenoxy)phenyl]-1-phenyl-2,2,2-trifluoroethane, 1,4-bis(3-aminophenyl) buta-1-ene-3-yne; 1,3-bis(3-aminophenyl) hexafluoropropane; 1,5-bis(3-aminophenyl) decafluoropentane; and 4,4'-bis[2-(4-aminophenoxyphenyl) hexafluoroisopropyl] diphenyl ether, diaminocyclohexane, bicyclohexyldiamine, 4,4'-diaminocyclohexylmethane, diaminofluorene, or a combination thereof. Such diamine compounds may be commercially available or may be synthesized by a well-known method.

The aromatic dicarbonyl compound may include TPCI, and may further include one or more of other dicarbonyl compound except for TPCI.

The other dicarbonyl compound may include, for example, isophthaloyl chloride (IPCI), 2-fluoro-terephthaloyl chloride, and the like, but is not limited thereto. These aromatic dicarbonyl chlorides may be commercially available, or may be synthesized by using a method well-known to a person skilled in the related art.

In an exemplary embodiment, the poly(amide-imide) copolymer film is a reaction product of the aromatic dianhydride, the aliphatic dianhydride, the aromatic diamine, and the aromatic dicarbonyl compound, wherein CBDA may be used in an amount of less than 46 mole percent (mol %), for example, less than or equal to 45 mol %, for example, greater than or equal to 5 mol % and less than or equal to 45 mol %, for example, greater than or equal to 10 mol % and less than or equal to 45 mol %, based on the total amount of the aromatic dianhydride, the aliphatic dianhydride, and the aromatic dicarbonyl compound in the reaction.

CBDA has a rigid structure as represented by the following Chemical Formula 1, and thus, is believed to render the poly(amide-imide) copolymer film prepared by copolymerizing the same in an amount of the above range with the aromatic diamine, along with the aromatic dianhydride and the aromatic dicarbonyl compound, having an improved mechanical property:

Chemical Formula 1

When the amount of CBDA exceeds 45 mol %, it may not be mixed well with the other aromatic compounds to become a homogeneous composition.

In an exemplary embodiment, the poly(amide-imide) copolymer film is a reaction product of the aromatic dianhydride, the aliphatic dianhydride, the aromatic diamine, and the aromatic dicarbonyl compound, wherein an amount of TPCI is greater than or equal to 25 mol % and less than or equal to 75 mol % based on the total amount of the aromatic dianhydride, the aliphatic dianhydride, and the aromatic dicarbonyl compound.

As described above, a poly(amide-imide) copolymer film may have more improved mechanical properties than a polyimide film, as the former is further copolymerized with an aromatic dicarbonyl compound. Among the aromatic dicarbonyl compounds, when TPCI is used in an amount of greater than or equal to 25 mol % and less than or equal to 75 mol %, for example, in an amount of greater than or equal to 30 mol % and less than or equal to 70 mol %, based on the total amount of the aromatic dianhydride, the aliphatic dianhydride, and the aromatic dicarbonyl compound, the obtained poly(amide-imide) copolymer film may have a further improved mechanical property without deteriorating an optical property of the film.

The poly(amide-imide) copolymer film is a reaction product of the aromatic dianhydride, the aliphatic dianhydride, the aromatic diamine, and the aromatic dicarbonyl compound, wherein BPDA may be used in an amount of greater than or equal to 5 mol %, for example, greater than or equal to 10 mol %, based on the total amount of the aromatic dianhydride, the aliphatic dianhydride, and the aromatic dicarbonyl compound in the reaction.

As described above, BPDA has a rigid structure due to two benzene rings connected in plane as represented by the following Chemical Formula 2, and thus, may provide the poly(amide-imide) copolymer film having a further improved mechanical property:

Chemical Formula 2

BPDA may include at least one of s-BPDA (3,3',4,4'-biphenyltetracarboxylic dianhydride) as represented by Chemical Formula 2-1, a-BPDA (2,3,3',4'-biphenyltetracarboxylic dianhydride) as represented by Chemical Formula 2-2, i-BPDA (2,2',3,3'-biphenyltetracarboxylic dianhydride) as represented by Chemical Formula 2-3, and a combination thereof.

Chemical Formula 2-1

Chemical Formula 2-2

Chemical Formula 2-3

In an exemplary embodiment, BPDA may include s-BPDA.

In an exemplary embodiment, the poly(amide-imide) copolymer film is a reaction product of the aromatic dianhydride, the aliphatic dianhydride, the aromatic diamine, and the aromatic dicarbonyl compound, wherein 6FDA may be used in an amount of greater than or equal to 10 mol %, for example, greater than or equal to 15 mol %, based on the total amount of the aromatic dianhydride, the aliphatic dianhydride, and the aromatic dicarbonyl compound in the reaction.

By including 6FDA as represented by Chemical Formula 3 below, the poly(amide-imide) copolymer film may have an improved optical property:

Chemical Formula 3

In an exemplary embodiment, the poly(amide-imide) copolymer film is a reaction product of the aromatic dianhydride, the aliphatic dianhydride, the aromatic diamine, and the aromatic dicarbonyl compound, wherein CBDA may be used in an amount of greater than or equal to 10 mol % and less than or equal to 45 mol %, BPDA may be used in an amount of greater than or equal to 10 mol % and less than or equal to 45 mol %, 6FDA may be used in an amount of greater than or equal to 10 mol % and less than or equal to 30 mol %, and TPCI may be used in an amount of greater than or equal to 30 mol % and less than or equal to 70 mol %, based 100 mol % of TFDB, in the reaction.

The poly(amide-imide) copolymer film prepared by copolymerizing TFDB, CBDA, BPDA, 6FDA, and TPCI in the above mole ratio ranges may have an improved mechanical property, for example, a tensile modulus of greater than or equal to 5.4 GPa, as well as a good optical property, for example, a low YI of less than or equal to about 3.6, and a high light transmittance of greater than or equal to about 88% in a wavelength range of 380 nanometers (nm) to 780 nm.

Further, the poly(amide-imide) copolymer film passes flexibility test as it is does not get broken upon folding and unfolding by hand.

As described above, the poly(amide-imide) copolymer film, according to an embodiment, meets high mechanical and optical properties required for a high hardness window film for a display device, for example, a flexible display device.

The poly(amide-imide) copolymer film may be prepared by using a conventional method for preparing a poly(amide-imide) copolymer film, where the aromatic dianhydride and aliphatic dianhydride, the aromatic diamine, and the aromatic dicarbonyl compound are copolymerized, and the obtained copolymer is partially or completely imidized, if necessary, and then is casted on a substrate to form a film.

The method for preparing a poly(amide-imide) copolymer is also well-known in the related art. A conventional method for preparing a poly(amide-imide) copolymer includes reacting an aromatic dicarbonyl compound, for example, a diacyl halide compound, with a diamine in an aprotic polar organic solvent to form an amide structural unit, providing additional diamine and dianhydride thereto to react together to form an amic acid structural unit, as well as connecting the formed amic acid structural unit and amide structural unit to form a poly(amide-amic acid) copolymer. The prepared poly(amide-amic acid) copolymer may become a poly(amide-imide) copolymer by chemical or thermal imidization.

Alternatively, a diacyl halide compound and excess amount of a diamine react first to form an 'amide-structural unit-containing oligomer', both ends of which are capped with amino groups, and the obtained 'amide-structural unit-containing oligomer' reacts, as a diamine, with a dianhydride to form a poly(amide-imide) copolymer. According to this method, it is possible to omit the precipitation process to remove the salt of a halogenated hydrogen (HX: 'H' indicates hydrogen, and 'X' indicates halogen), for example, hydrogen chloride (HCl), which is a by-product produced in the process of preparing an amide structural unit in the conventional method. As a result, total process time and cost may be reduced, and the final yield of the prepared poly(amide-imide) copolymer may increase. Further, while it is difficult to increase the amount of the amide-structural unit beyond a certain degree, by using the conventional method of preparing a poly(amide-imide) copolymer, due to poor solubility, it is possible to do so in the latter method, as the by-product of HX is not produced upon increasing the amount of the amide-structural unit.

The poly(amide-imide) copolymer, according to an embodiment, may be prepared by either method, and the method is not limited thereto.

In the two methods of preparing the poly(amide-imide) copolymer, although the reaction conditions are not specifically limited, the reaction temperature may be the room temperature, i.e., for example, at about 25° C., and the reaction time may be from about 48 hours to about 72 hours. Further, the reaction may be performed in an atmosphere of an inert gas, such as, argon (Ar), nitrogen ($N_2$), and the like.

The aprotic polar solvent may be, for example, a sulfoxide solvent such as dimethylsulfoxide, diethylsulfoxide and the like, a formamide solvent such as N,N-dimethyl formamide, N,N-diethylformamide, and the like, an acetamide solvent such as N,N-dimethyl acetamide, N,N-diethylacetamide and the like, a pyrrolidone solvent such as N-methyl-2-pyrrolidone, N-vinyl-2-pyrrolidone and the like, a phenol solvent such as phenol, o-, m- or p-cresol, xylenol, halogenated phenol, catechol, and the like, or hexamethylphosphoramide, γ-butyrolactone, and the like. These may be used alone or as a mixture. However, the solvent is not limited thereto, and an aromatic hydrocarbon such as xylene and toluene may be used.

Thus, the prepared poly(amide-imide) copolymer may be formed into a film by using a known method, such as, for example, a dry-wet method, a dry method, or a wet method, but is not limited thereto.

When the film is manufactured with a solution including the poly(imide-amide) copolymer by using the dry-wet method, where a layer is formed by extruding the solution of the poly(amide-imide) copolymer from a mouth piece on a supporter, such as drum or an endless belt, drying the layer, and evaporating the solvent from the layer until the layer has a self-maintenance property. The drying may be performed, for example, at about 25° C. to about 130° C., for about 1 hour or less. When the surface of the drum and/or the endless belt used for the drying process becomes flat, a layer with a flat surface is formed. The layer obtained after the drying process is delaminated from the supporter, and subjected to a wet process, desalted, and/or desolventized. The manufacturing of the film is completed after the layer is elongated, dried, and/or heat treated.

The heat treatment may be performed at about 200° C. to about 300° C., for example, at about 250° C., for a few minutes.

The heat-treated film may be cooled slowly, for example, at a cooling rate of about 50 degrees Centigrade per second (° C./second) or lower.

The film may be formed as a single layer or as multiple layers.

As described above, the poly(amide-imide) copolymer film has high mechanical strength and good optical properties, and thus, may be used as a window for a display device. When used as a window for a display device, a hard coating layer disposed on at least one surface of the poly(amide-imide) copolymer film may further be included.

Figure 1:
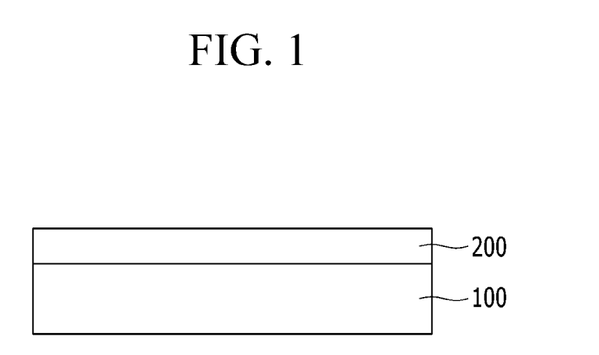
FIG. 1 is a schematic cross-sectional view of a window for a display device in accordance with an exemplary embodiment.

FIG. 1 schematically illustrates a cross sectional view of a window for a display device, according to an exemplary embodiment. In FIG. 1, a hard coating layer 200 is disposed on a surface of the poly(amide-imide) copolymer film 100, according to an embodiment.

Figure 2:
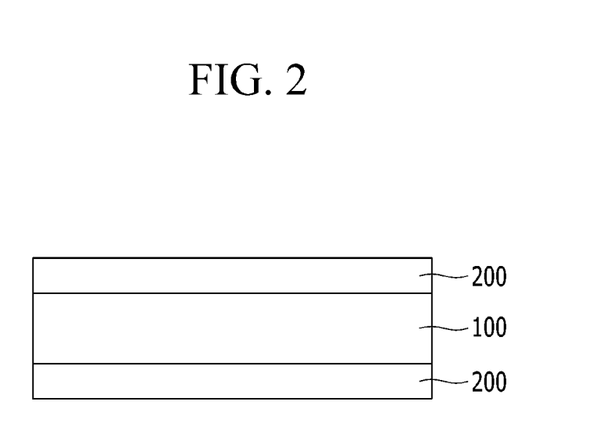
FIG. 2 is a schematic cross-sectional view of a window for a display device in accordance with another exemplary embodiment.

FIG. 2 shows a schematic cross sectional view of a window for a display device, according to another exemplary embodiment. In FIG. 2, hard coating layers 200 are disposed on each of the two surfaces of the poly(amide-imide) copolymer film 100, according to an embodiment.

The hard coating layer may have at least one multi-layer structure. The hard coating layer plays a role of increasing surface hardness of a window film. The hard coating layer may be formed by using a material cured by heat or light (that is, a hard coating material). Examples of the material may be an acrylate polymer, a polycaprolactone, a urethane-acrylate copolymer, a polyrotaxane, an epoxy polymer, an organosilicone material, an inorganic hard coating material, and the like, but are not limited thereto. Examples of a multi-functional acrylate monomer may be trimethylolpropane triacrylate (TMPTA), trimethylolpropanethoxy triacrylate (TMPEOTA), glycerine propoxylated triacrylate (GPTA), pentaerythritol tetraacrylate (PETA), and dipentaerythritol hexaacrylate (DPHA), but are not limited thereto. The urethane-acrylate material and multi-functional acrylate material may have improved adherence and high productivity.

In addition, a pressure sensitive adhesive layer may be formed on at least one side of the poly(amide-imide) copolymer film. The pressure-sensitive adhesive layer may include 8146-50 μm PSA manufactured by 3M Company Ltd. The poly(amide-imide) copolymer film may be disposed on a display module of a display device, and herein, when the film has the pressure sensitive adhesive layer, the film may be fixed on the display module through the pressure sensitive adhesive layer. Accordingly, the poly(amide-imide) copolymer film may be used for a window film of a display device. The display module may be a liquid crystal display module, an organic light-emitting display module, a plasma display module, an electric field effect display module, an electrophoretic display module, and the like, but is not limited thereto.

Hereafter, this disclosure is described in detail with reference to examples. The following examples and comparative examples are not restrictive, but are illustrative.

EXAMPLES

Synthesis Example 1: Preparation of Amide Group-Containing Oligomer

An amide group-containing oligomer prepared from TPCI (terephthaloic dichloride) and TFDB (2,2'-bis(trifluoromethyl)benzidine) is prepared, wherein at both terminal ends of TPCI (terephthaloic dichloride) TFDB are bonded to form an aramid structure, according to the following Reaction Scheme 1:

Reaction Scheme 1

Amide Oligomer

Particularly, 1 mole equivalent (0.107 moles (mol), 34.3 grams, g) of 2,2'-bis(trifluoromethyl)benzidine (TFDB) and 2.0 mole equivalents (0.3 mol, 23.7 g) of pyridine are dissolved in 700 g of N,N-dimethyl acetamide, as a solvent, in a round-bottomed flask, and the remaining TFDB is completely dissolved with further 50 milliliters (mL) of DMAC. Then, 15.2 g (0.7 mole equivalents, 0.075 mol) of TPCI (terephthaloic dichloride) is divided into four portions and mixed with the TFDB solution at 25° C., and the mixture is vigorously stirred for 15 minutes.

The resulting solution is stirred under nitrogen atmosphere for 2 hours, added to 7 liters (L) of a NaCl solution containing 350 g of NaCl, and the mixture is stirred for 10 minutes. Then, a solid produced therein is filtered, re-suspended twice with 5 L of deionized water, and re-filtered. Subsequently, a finally filtered product on a filter is thoroughly pressed to remove most of the water remaining and dried at 90° C. under vacuum for 48 hours to obtain an amide group-containing oligomer as a product described in Reaction Scheme 1. The amide group-containing oligomer has a number average molecular weight of about 1,375 Daltons.

Example 1: Preparation of Poly(Amide-Imide) Copolymer Film 170 grams of N,N-dimethyl acetamide (DMAc), as a solvent, is charged into a 250 mL reactor, pre-heated to 25° C. and equipped with a mechanical stirrer, a nitrogen inlet, and a cooler, while introducing nitrogen gas thereinto. Subsequently, 22.26 grams (0.0155 moles) of the amide group-containing oligomer prepared in Synthesis Example 1 and 1.27 grams (0.0039 moles) of TFDB are added thereto and dissolved. Then, 1.09 grams (0.0055 moles) of CBDA, 1.64 grams (0.0055 moles) of s-BPDA, and 3.72 grams (0.0083 moles) of 2,2-bis-(3,4-dicarboxyphenyl)hexafluoropropane dianhydride) (6FDA) are added to the solution, and the mixture is stirred for 48 hours at 25° C. Then, 4.64 grams of pyridine and 5.99 grams of acetic anhydride are added thereto, and the mixture is stirred for 24 hours to obtain a poly(amic acid-amide) copolymer solution, of which the solid content is 15 percent by weight (weight %).

After lowering the temperature of the poly(amic acid-amide) solution to 25° C., the solution is casted on a glass substrate, and dried for 40 minutes on a hot plate at a temperature of 130° C. Then, the film is separated from the glass substrate and introduced into a furnace, where the temperature is increased from the room temperature to 250° C., at a heating rate of 10° C. per minutes, maintained at 250° C. for about 30 minutes, and slowly cooled to room temperature to obtain a poly(imide-amide) copolymer film.

Example 2: Preparation of Poly(Amide-Imide) Copolymer Film 170 grams of N,N-dimethyl acetamide (DMAc), as a solvent, is charged into a 250 mL reactor, pre-heated to 25° C. and equipped with a mechanical stirrer, a nitrogen inlet, and a cooler, while introducing nitrogen gas thereinto. Subsequently, 10.03 grams (0.007 moles) of the amide group-containing oligomer prepared in Synthesis Example 1 and 9.94 grams (0.0031 moles) of TFDB are added thereto and dissolved. Then, 4.8 grams (0.024 moles) of CBDA, 1.6 grams (0.0054 moles) of s-BPDA, and 3.61 grams (0.0081 moles) of 6FDA are added to the solution, and the mixture is stirred for 48 hours at 25° C. Then, 9.03 grams of pyridine and 11.66 grams of acetic anhydride are added thereto, and the mixture is stirred for 24 hours to obtain a poly(amic acid-amide) copolymer solution, of which the solid content is 15 weight %.

After lowering the temperature of the poly(amic acid-amide) solution to 25° C., the solution is casted on a glass substrate, and dried for 40 minutes on a hot plate at a temperature of 130° C. Then, the film is separated from the glass substrate and introduced into a furnace, where the temperature is increased from the room temperature to 250° C., at a heating rate of 10° C. per minutes, maintained at 250° C. for about 30 minutes, and slowly cooled to room temperature to obtain a poly(imide-amide) copolymer film.

Example 3: Preparation of Poly(Amide-Imide) Copolymer Film 170 grams of N,N-dimethyl acetamide (DMAc), as a solvent, is charged into a 250 mL reactor, pre-heated to 25° C. and equipped with a mechanical stirrer, a nitrogen inlet, and a cooler, while introducing nitrogen gas thereinto. Subsequently, 9.44 grams (0.0065 moles) of the amide group-containing oligomer prepared in Synthesis Example 1 and 9.36 grams (0.029 moles) of TFDB are added thereto and dissolved. Then, 1.0 grams (0.0051 moles) of CBDA, 6.78 grams (0.023 moles) of s-BPDA, and 3.4 grams (0.0076 moles) of 6FDA are added to the solution, and the mixture is stirred for 48 hours at 25° C. Then, 8.5 grams of pyridine and 10.98 grams of acetic anhydride are added thereto, and the mixture is stirred for 24 hours to obtain a poly(amic acid-amide) copolymer solution, of which the solid content is 15 weight %.

After lowering the temperature of the poly(amic acid-amide) solution to 25° C., the solution is casted on a glass substrate, and dried for 40 minutes on a hot plate at a temperature of 130° C. Then, the film is separated from the glass substrate and introduced into a furnace, where the temperature is increased from the room temperature to 250° C., at a heating rate of 10° C. per minutes, maintained at 250° C. for about 30 minutes, and slowly cooled to room temperature to obtain a poly(imide-amide) copolymer film.

Example 4: Preparation of Poly(Amide-Imide) Copolymer Film 170 grams of N,N-dimethyl acetamide (DMAc), as a solvent, is charged into a 250 mL reactor, pre-heated to 25° C. and equipped with a mechanical stirrer, a nitrogen inlet, and a cooler, while introducing nitrogen gas thereinto. Subsequently, 13.74 grams (0.0096 moles) of the amide group-containing oligomer prepared in Synthesis Example 1 and 6.97 grams (0.021 moles) of TFDB are added thereto and dissolved. Then, 2.28 grams (0.011 moles) of CBDA, 3.42 grams (0.011 moles) of s-BPDA, and 3.58 grams (0.008 moles) of 6FDA are added to the solution, and the mixture is stirred for 48 hours at 25° C. Then, 7.44 grams of pyridine and 9.6 grams of acetic anhydride are added thereto, and the mixture is stirred for 24 hours to obtain a poly(amic acid-amide) copolymer solution, of which the solid content is 15 weight %.

After lowering the temperature of the poly(amic acid-amide) solution to 25° C., the solution is casted on a glass substrate, and dried for 40 minutes on a hot plate at a temperature of 130° C. Then, the film is separated from the glass substrate and introduced into a furnace, where the temperature is increased from the room temperature to 250° C., at a heating rate of 10° C. per minutes, maintained at 250° C. for about 30 minutes, and slowly cooled to room temperature to obtain a poly(imide-amide) copolymer film.

Example 5: Preparation of Poly(Amide-Imide) Copolymer Film 170 grams of N,N-dimethyl acetamide (DMAc), as a solvent, is charged into a 250 mL reactor, pre-heated to 25° C. and equipped with a mechanical stirrer, a nitrogen inlet, and a cooler, while introducing nitrogen gas thereinto. Subsequently, 17.18 grams (0.012 moles) of the amide group-containing oligomer prepared in Synthesis Example 1 and 5.09 grams (0.015 moles) of TFDB are added thereto and dissolved. Then, 2.73 grams (0.013 moles) of CBDA, 2.38 grams (0.008 moles) of s-BPDA, and 2.6 grams (0.005 moles) of 6FDA are added to the solution, and the mixture is stirred for 48 hours at 25° C. Then, 6.62 grams of pyridine and 8.55 grams of acetic anhydride are added thereto, and the mixture is stirred for 24 hours to obtain a poly(amic acid-amide) copolymer solution, of which the solid content is 15 weight %.

After lowering the temperature of the poly(amic acid-amide) solution to 25° C., the solution is casted on a glass substrate, and dried for 40 minutes on a hot plate at a temperature of 130° C. Then, the film is separated from the glass substrate and introduced into a furnace, where the temperature is increased from the room temperature to 250° C., at a heating rate of 10° C. per minutes, maintained at 250° C. for about 30 minutes, and slowly cooled to room temperature to obtain a poly(imide-amide) copolymer film.

Examples 6 to 8: Preparation of Poly(Amide-Imide) Copolymer Films

The films, according to Examples 6 to 8, have the same composition as the film, according to Example 5, but have different thickness values as described in Table 1 below.

Comparative Example 1: Preparation of Poly(Amide-Imide) Copolymer Film 170 grams of N,N-dimethyl acetamide (DMAc), as a solvent, is charged into a 250 mL reactor, pre-heated to 25° C. and equipped with a mechanical stirrer, a nitrogen inlet, and a cooler, while introducing nitrogen gas thereinto. Subsequently, 15.7 grams (0.01 moles) of the amide group-containing oligomer prepared in Synthesis Example 1 and 4.69 grams (0.014 moles) of TFDB are added thereto and dissolved. Then, 3.48 grams (0.011 moles) of s-BPDA, and 6.12 grams (0.013 moles) of 6FDA are added to the solution, and the mixture is stirred for 48 hours at 25° C. Then, 6.08 grams of pyridine and 7.85 grams of acetic anhydride are added thereto, and the mixture is stirred for 24 hours to obtain a poly(amic acid-amide) copolymer solution, of which the solid content is 15 weight %.

After lowering the temperature of the poly(amic acid-amide) solution to 25° C., the solution is casted on a glass substrate, and dried for 40 minutes on a hot plate at a temperature of 130° C. Then, the film is separated from the glass substrate and introduced into a furnace, where the temperature is increased from the room temperature to 250° C., at a heating rate of 10° C. per minutes, maintained at 250° C. for about 30 minutes, and slowly cooled to room temperature to obtain a poly(imide-amide) copolymer film.

Comparative Example 2: Preparation of Poly(Amide-Imide) Copolymer Film 170 grams of N,N-dimethyl acetamide (DMAc), as a solvent, is charged into a 250 mL reactor, pre-heated to 25° C. and equipped with a mechanical stirrer, a nitrogen inlet, and a cooler, while introducing nitrogen gas thereinto, and 10.06 grams (0.007 moles) of the amide group-containing oligomer prepared in Synthesis Example 1 and 9.97 grams (0.031 moles) of TFDB are added thereto and dissolved. Then, 4.89 grams (0.024 moles) of CBDA, 1.59 grams (0.005 moles) of s-BPDA, and 3.47 grams (0.007 moles) of 6FDA are added to the solution, and the mixture is stirred for 48 hours at 25° C. Then, 9.06 grams of pyridine and 11.69 grams of acetic anhydride are added thereto, and the mixture is stirred for 24 hours to obtain a poly(amic acid-amide) copolymer solution, of which the solid content is 15 weight %.

After lowering the temperature of the poly(amic acid-amide) solution to 25° C., the solution is casted on a glass substrate, and dried for 40 minutes on a hot plate at a temperature of 130° C. Then, the film is separated from the glass substrate and introduced into a furnace, where the temperature is increased from the room temperature to 250° C., at a heating rate of 10° C. per minutes, maintained at 250° C. for about 30 minutes, and slowly cooled to room temperature to obtain a poly(imide-amide) copolymer film.

Comparative Example 3: Preparation of Poly(Amide-Imide) Copolymer Film 170 grams of N,N-dimethyl acetamide (DMAc), as a solvent, is charged into a 250 mL reactor, pre-heated to 25° C. and equipped with a mechanical stirrer, a nitrogen inlet, and a cooler, while introducing nitrogen gas thereinto, and 18.9 grams (0.0013 moles) of the amide group-containing oligomer prepared in Synthesis Example 1 and 4.56 grams (0.014 moles) of TFDB are added thereto and dissolved. Then, 4.47 grams (0.022 moles) of CBDA, and 2.04 grams (0.004 moles) of 6FDA are added to the solution, and the mixture is stirred for 48 hours at 25° C. Then, 6.51 grams of pyridine and 8.41 grams of acetic anhydride are added thereto, and the mixture is stirred for 24 hours to obtain a poly(amic acid-amide) copolymer solution, of which the solid content is 15 weight %.

After lowering the temperature of the poly(amic acid-amide) solution to 25° C., the solution is casted on a glass substrate, and dried for 40 minutes on a hot plate at a temperature of 130° C. Then, the film is separated from the glass substrate and introduced into a furnace, where the temperature is increased from the room temperature to 250° C., at a heating rate of 10° C. per minutes, maintained at 250° C. for about 30 minutes, and slowly cooled to room temperature to obtain a poly(imide-amide) copolymer film.

Comparative Example 4: Preparation of Poly(Amide-Imide) Copolymer Film 170 grams of N,N-dimethyl acetamide (DMAc), as a solvent, is charged into a 250 mL reactor, pre-heated to 25° C. and equipped with a mechanical stirrer, a nitrogen inlet, and a cooler, while introducing nitrogen gas thereinto, and 13.65 grams (0.009 moles) of the amide group-containing oligomer prepared in Synthesis Example 1 and 7.62 grams (0.023 moles) of TFDB are added thereto and dissolved. Then, 2.99 grams (0.015 moles) of CBDA, 4.49 grams (0.015 moles) of s-BPDA, and 1.23 grams (0.002 moles) of 6FDA are added to the solution, and the mixture is stirred for 48 hours at 25° C. Then, 7.91 grams of pyridine and 10.2 grams of acetic anhydride are added thereto, and the mixture is stirred for 24 hours to obtain a poly(amic acid-amide) copolymer solution, of which the solid content is 15 weight %.

After lowering the temperature of the poly(amic acid-amide) solution to 25° C., the solution is casted on a glass substrate, and dried for 40 minutes on a hot plate at a temperature of 130° C. Then, the film is separated from the glass substrate and introduced into a furnace, where the temperature is increased from the room temperature to 250° C., at a heating rate of 10° C. per minutes, maintained at 250° C. for about 30 minutes, and slowly cooled to room temperature to obtain a poly(imide-amide) copolymer film.

Comparative Example 5: Preparation of Poly(Amide-Imide) Copolymer Film 170 grams of N,N-dimethyl acetamide (DMAc), as a solvent, is charged into a 250 mL reactor, pre-heated to 25° C. and equipped with a mechanical stirrer, a nitrogen inlet, and a cooler, while introducing nitrogen gas thereinto, and 16.13 grams (0.011 moles) of the amide group-containing oligomer prepared in Synthesis Example 1 and 4.8 grams (0.015 moles) of TFDB are added thereto and dissolved. Then, 2.06 grams (0.01 moles) of CBDA, and 7.0 grams (0.015 moles) of 6FDA are added to the solution, and the mixture is stirred for 48 hours at 25° C. Then, 6.23 grams of pyridine and 8.04 grams of acetic anhydride are added thereto, and the mixture is stirred for 24 hours to obtain a poly(amic acid-amide) copolymer solution, of which the solid content is 15 weight %.

After lowering the temperature of the poly(amic acid-amide) solution to 25° C., the solution is casted on a glass substrate, and dried for 40 minutes on a hot plate at a temperature of 130° C. Then, the film is separated from the glass substrate and introduced into a furnace, where the temperature is increased from the room temperature to 250° C., at a heating rate of 10° C. per minutes, maintained at 250° C. for about 30 minutes, and slowly cooled to room temperature to obtain a poly(imide-amide) copolymer film.

Evaluation: Evaluation of Mechanical and Optical Properties of Poly(Amide-Imide) Copolymer Films Poly(amide-imide) copolymer films prepared in Examples 1 to 8 and Comparative Examples 1 to 5 are evaluated for mechanical and optical properties, and the results are described in Table 1 below.

The properties are determined as below:

(1) Thickness of Film

Thickness of a film is determined by using Micrometer (manufactured by Mitutoyo Company Ltd.).

(2) Tensile Modulus

Tensile modulus is measured for a film having a width of about 10 millimeters and a length of about 150 millimeters, according to an ASTM D882 method, upon extending at a rate of 0.5 millimeters per minute. For each sample, measurement is performed for five times and the average value is taken.

(3) Yellowness Index (YI) and Light Transmittance

YI and light transmittance are measured for a film having a thickness of about 80 micrometers, according to an ASTM D1925 method, by using a spectrophotometer, CM-3600d made by Konica Minolta Inc.

(4) Flexibility

Flexibility is evaluated upon folding and unfolding a film by hand. If the film is broken or cracked, 'X' is represented, and if not, 'O' represented.

TABLE 1

| | Composition (mol %) | | | | | Thickness (μm) | Tensile Modulus (GPa) | YI @ 80 μm | Transmittance (%) @ 380~780 μm | Flexibility |
|---|---|---|---|---|---|---|---|---|---|---|
| | TPCI | CBDA | BPDA | 6FDA | TFDB | | | | | |
| Example 1 | 65 | 10 | 10 | 15 | 100 | 72 | 6.0 ± 0.3 | 3.6 | 88.1 | ○ |
| Example 2 | 30 | 45 | 10 | 15 | 100 | 69 | 5.9 ± 0.4 | 2.8 | 88.3 | ○ |
| Example 3 | 30 | 10 | 45 | 15 | 100 | 68 | 5.9 ± 0.3 | 3.0 | 88.2 | ○ |
| Example 4 | 41.6 | 21.7 | 21.7 | 15 | 100 | 67 | 6.2 ± 0.5 | 2.8 | 88.8 | ○ |
| Comparative Example 1 | 70 | 0 | 14.5 | 16.5 | 100 | 71 | 5.5 ± 0.2 | 3.7 | 87.9 | ○ |
| Comparative Example 2 | 30 | 46 | 10 | 14 | 100 | | Solution becomes cloudy. | | | |
| Comparative Example 3 | 52.9 | 39.2 | 0 | 7.9 | 100 | | Solution becomes gelated. | | | |
| Comparative Example 4 | 40 | 27.5 | 27.5 | 5 | 100 | | Film becomes whitened. | | | |
| Example 5 | 50 | 25 | 14.5 | 10.5 | 100 | 34 | 7.5 ± 0.2 | 2.3 | 88.6 | ○ |
| Example 6 | 50 | 25 | 14.5 | 10.5 | 100 | 53 | 6.7 ± 0.3 | 2.8 | 88.4 | ○ |
| Example 7 | 50 | 25 | 14.5 | 10.5 | 100 | 72 | 5.9 ± 0.4 | 3.3 | 88.2 | ○ |
| Example 8 | 50 | 25 | 14.5 | 10.5 | 100 | 80 | 5.8 ± 0.4 | 3.6 | 88.0 | ○ |
| Comparative Example 5 | 50 | 20 | 0 | 30 | 100 | 80 | 4.5 ± 0.2 | 6.7 | 87.8 | X |

As shown from Table 1, the poly(amide-imide) copolymer films prepared from TPCI, CBDA, BPDA, 6FDA, and TFDB, especially from a certain amounts of CBDA, BPDA, and 6FDA, have high mechanical strength and good optical properties.

Particularly, the poly(amide-imide) copolymer films, according to Examples 1 to 8, each of which is prepared from 45 mol % or less of CBDA, and each 10 mol % or more of BPDA and 6FDA, based on 100 mol % of TFDB, have a tensile modulus of at least 5.4 Giga pascals (GPa) at a film thickness of about 30 μm to about 80 μm, YI of less than or equal to 3.6 at a film thickness of about 80 μm, and a light transmittance of greater than or equal to 88.0% at a wavelength range of 380 nanometers (nm) to 780 nanometers. That is, the films have good optical properties and good mechanical properties.

On the contrary, the poly(amide-imide) copolymer film, according to Comparative Example 1, which is prepared by not using CBDA, has a tensile modulus of 5.5±0.2 GPa and YI of 3.7 at a film thickness of 80 μm, which is much lower tensile modulus and much higher YI than that of the poly(amide-imide) copolymer film, according to Example 1, which is prepared with a similar composition with Comparative Example 1, except for CBDA. Also, the tensile modulus and YI of the film, according to Comparative Example 1, is much lower and much higher, respectively, than the tensile modulus and YI of the poly(amide-imide) copolymer film, according to Example 8, which has different composition from but has a similar thickness with Comparative Example 1.

In Comparative Example 2, CBDA is contained in an amount of more than 45 mole percent (mol %), i.e., 46 mol %, it is not possible to form a film as the solution of the poly(amide-imide) copolymer become cloudy.

In Comparative Example 3, which does not contain BPDA but contains 6FDA in an amount of 7.9 mol %, the poly(amide-imide) copolymer solution becomes gelated, and thus, cannot form a film.

Meanwhile, the poly(amide-imide) copolymer film, according to Comparative Example 5, which does not contain BPDA, but contains 6FDA in an amount of 30 mol %, although the poly(amide-imide) copolymer solution is not gelated, has relatively low tensile modulus of 4.5±0.2 GPa and relatively high YI of 6.7, which do not represent good mechanical and optical properties. Further, the film is broken upon folding and unfolding by hand, as it does not have any flexibility.

In Comparative Example 4, although all the components, TPCI, CBDA, BPDA, 6FDA, and TFDB, are contained, the film prepared becomes whitened as 6FDA is contained in a small amount of 5 mol %.

Meanwhile, the poly(amide-imide) copolymer films, according to Examples 5 to 8, have the same compositions as each other, that is, the amounts of TPCI, CBDA, BPDA, 6FDA, and TFDB are respectively the same as in these Examples, but have different thickness values from each other from about 34 μm to about 80 μm. All the films, however, have high tensile moduli of at least 5.4 GPa, and low YIs of less than 3.6.

Accordingly, all the films, according to the Examples, meet high mechanical strength and good optical properties required for a high hardness window for a display device at a thickness range of about 30 μm to about 80 μm.

Meanwhile, films prepared with the same composition as Comparative Example 1, but having different thickness values of about 30 μm, about 45 μm, about 55 μm, and about 71 μm, respectively, are prepared and measured for tensile moduli. When having a thickness of about 71 μm, the tensile modulus is about 5.5±0.2 GPa, which is lower than the film, according to Example 7, which has a similar thickness of about 72 μm, and has a tensile modulus of about 5.9±0.4 GPa.

Figure 3:
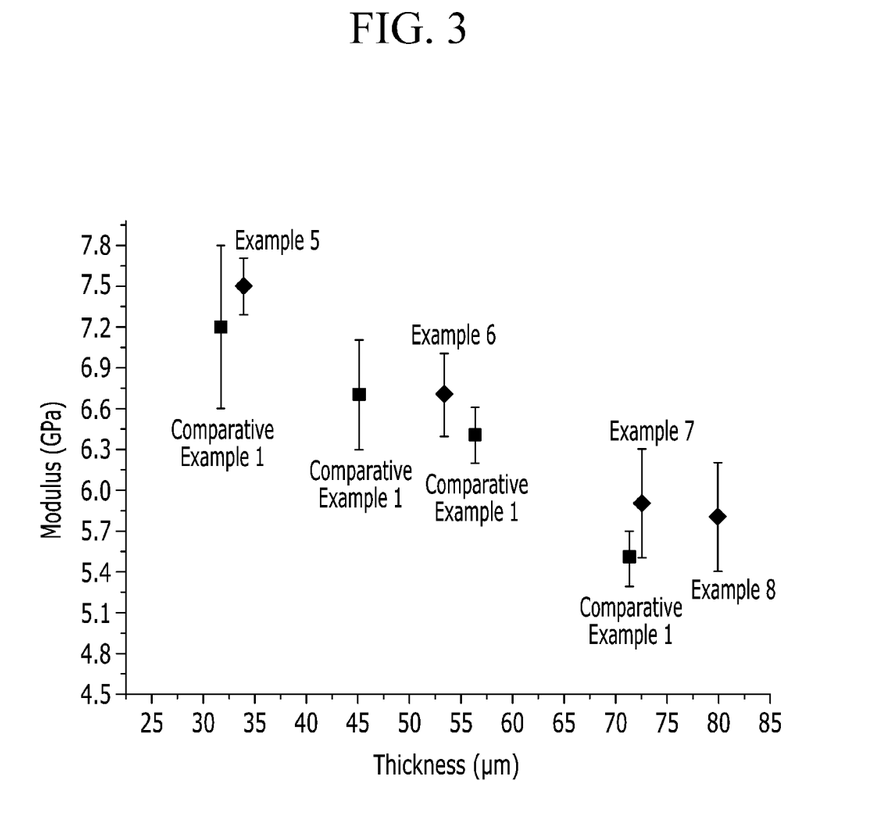
FIG. 3 is a graph of modulus (giga pascales, GPa) versus thickness (micrometers, μm) showing tensile moduli of the films prepared in accordance with Examples 5 to 8 and Comparative Example 1, with regard to the thickness values of the films.

FIG. 3 shows tensile moduli of the films, according to Examples 5 to 7 and Comparative Example 1, with regard to thickness values of the films.

While this disclosure has been described in connection with what is presently considered to be practical exemplary embodiments, it is to be understood that the present inventive concept is not limited to the disclosed embodiments, but, on the contrary, is intended to cover various modifications and equivalent arrangements included within the spirit and scope of the appended claims.

What is claimed is:

1. A poly(amide-imide) copolymer film having a tensile modulus of greater than or equal to 5.4 gigapascals, and a yellowness index of less than or equal to 3.6, wherein the poly(amide-imide) copolymer film is a reaction product of an aromatic dianhydride comprising biphenyl tetracarboxylic dianhydride in an amount of greater than or equal to 10 mole percent and less than or equal to 45 mole percent and 4,4'-hexafluoroisopropylidene diphthalic dianhydride in an amount of greater than or equal to 10 mole percent and less than or equal to 30 mole percent, an aliphatic dianhydride comprising 1,2,3,4-cyclobutane tetracarboxylic dianhydride in an amount of greater than or equal to 5 mole percent and less than or equal to 45 mole percent, an aromatic dicarbonyl compound comprising terephthaloyl dichloride in an amount of greater than or equal to 25 mole percent and less than or equal to 75 mole percent, and an aromatic diamine comprising 2,2-bis(trifluoromethyl) benzidine, wherein the mole percent for each of the aromatic dianhydride, the aliphatic dianhydride, and the aromatic dicarbonyl compound is based on the total mole number of the aromatic dianhydride, the aliphatic dianhydride, and the aromatic dicarbonyl compound.

2. The poly(amide-imide) copolymer film according to claim 1, wherein the amount of 1,2,3,4-cyclobutane tetracarboxylic dianhydride is greater than or equal to 10 mole percent and less than or equal to 25 mole percent based on the total mole number of the aromatic dianhydride, the aliphatic dianhydride, and the aromatic dicarbonyl compound.

3. The poly(amide-imide) copolymer film according to claim 1, wherein the amount of 1,2,3,4-cyclobutane tetracarboxylic dianhydride is greater than or equal to 10 mole percent and less than or equal to 45 mole percent based on the total mole number of the aromatic dianhydride, the aliphatic dianhydride, and the aromatic dicarbonyl compound.

4. The poly(amide-imide) copolymer film according to claim 1, wherein the amount of terephthaloyl dichloride is greater than or equal to 30 mole percent and less than or equal to 70 mole percent based on the total mole number of the aromatic dianhydride, the aliphatic dianhydride, and the aromatic dicarbonyl compound.

5. The poly(amide-imide) copolymer film according to claim 1, wherein the amount of terephthaloyl dichloride is greater than or equal to 30 mole percent and less than or equal to 65 mole percent based on the total mole number of the aromatic dianhydride, the aliphatic dianhydride, and the aromatic dicarbonyl compound.

6. The poly(amide-imide) copolymer film according to claim 1, wherein the amount of biphenyl tetracarboxylic dianhydride is greater than or equal to 10 mole percent and less than or equal to 21.7 mole percent based on 100 mole percent of the aromatic dianhydride, the aliphatic dianhydride, and the aromatic dicarbonyl compound.

7. The poly(amide-imide) copolymer film according to claim 1, wherein the amount of 4,4'-hexafluoroisopropylidene diphthalic dianhydride is greater than or equal to 10 mole percent and less than or equal to 16.5 mole percent based on the total mole number of the aromatic dianhydride, the aliphatic dianhydride, and the aromatic dicarbonyl compound.

8. The poly(amide-imide) copolymer film according to claim 1, wherein the amount of 4,4'-hexafluoroisopropylidene diphthalic dianhydride is greater than or equal to 10.5 mole percent and less than or equal to 15 mole percent based on the total mole number of the aromatic dianhydride, the aliphatic dianhydride, and the aromatic dicarbonyl compound.

9. The poly(amide-imide) copolymer film according to claim 1, wherein the amount of 1,2,3,4-cyclobutane tetracarboxylic dianhydride is greater than or equal to 10 mole percent and less than or equal to 45 mole percent, and the amount of terephthaloyl dichloride is greater than or equal to 30 mole percent and less than or equal to 70 mole percent based on the total mole number of the aromatic dianhydride, the aliphatic dianhydride, and the aromatic dicarbonyl compound.

10. The poly(amide-imide) copolymer film according to claim 1, wherein biphenyl tetracarboxylic dianhydride comprises at least one of 3,3',4,4'-biphenyltetracarboxylic dianhydride, 2,3,3',4'-biphenyltetracarboxylic dianhydride, 2,2', 3,3'-biphenyltetracarboxylic dianhydride, or a combination thereof.

11. The poly(amide-imide) copolymer film according to claim 1, wherein the film has a light transmittance of greater than or equal to 88% in a wavelength range of 380 nanometers to 780 nanometers.

12. The poly(amide-imide) copolymer film according to claim 1, wherein the amount terephthaloyl dichloride is greater than or equal to 30 mole percent and less than or equal to 65 mole percent, the amount of biphenyl tetracarboxylic dianhydride is greater than or equal to 10 mole percent and less than or equal to 21.7 mole percent, and the amount of 4,4'-hexafluoroisopropylidene diphthalic dianhydride is greater than or equal to 10 mole percent and less than or equal to 16.5 mole percent based on the total mole number of the aromatic dianhydride, the aliphatic dianhydride, and the aromatic dicarbonyl compound.

13. The poly(amide-imide) copolymer film according to claim 1, wherein the tensile modulus is greater than or equal to 5.4 gigapascals and less than or equal to 7.5 gigapascals, and wherein the yellowness index of from is greater than or equal to 2.8 and less than or equal to 3.6.

14. A window for a display device comprising the poly (amide-imide) copolymer film according to claim 1.

15. The window according to claim 14, wherein the window further comprises a hard coating layer disposed on at least one surface of the poly(amide-imide) copolymer film.

16. The window according to claim 15, wherein the hard coating layer comprises at least one selected from an acrylate polymer, a polycaprolactone, a urethane-acrylate copolymer, a polyrotaxane, an epoxy polymer, an organosilicone material, an inorganic hard coating material, or a combination thereof.

17. A display device comprising the window for a display device according to claim 14.

18. The display device according to claim 17, wherein the display device is a flexible display device.

* * * * *